(12) United States Patent
Boos

(10) Patent No.: US 12,736,643 B2
(45) Date of Patent: Sep. 15, 2026

(54) METHOD AND SYSTEM FOR CONTINUOUS IN-FLIGHT MANAGEMENT OF AN ON-BOARD BEAM GENERATOR

(71) Applicant: AIRBUS HELICOPTERS, Marignane Cedex (FR)

(72) Inventor: Nikolaus Boos, Marignane (FR)

(73) Assignee: AIRBUS HELICOPTERS, Marignane Cedex (FR)

( * ) Notice: Subject to any disclaimer, the term of this patent is extended or adjusted under 35 U.S.C. 154(b) by 695 days.

(21) Appl. No.: 18/198,676

(22) Filed: May 17, 2023

(65) Prior Publication Data

US 2023/0384435 A1 Nov. 30, 2023

(30) Foreign Application Priority Data

May 31, 2022 (FR) ...................................... 2205114

(51) Int. Cl.
*G01S 7/497* (2006.01)
*B64D 45/00* (2006.01)
*G01S 17/933* (2020.01)

(52) U.S. Cl.
CPC .............. *G01S 7/497* (2013.01); *B64D 45/00* (2013.01); *G01S 17/933* (2013.01); *B64D 2045/008* (2013.01)

(58) Field of Classification Search
None
See application file for complete search history.

(56) References Cited

U.S. PATENT DOCUMENTS 4,143,835 A 3/1979 Jennings, Jr. et al.
8,400,625 B1 3/2013 Young et al.
2009/0273770 A1 11/2009 Bauhahn et al.
(Continued)

FOREIGN PATENT DOCUMENTS

EP 3521855 A1 8/2019
FR 2104570 A1 4/1972
FR 2970358 A1 7/2012

OTHER PUBLICATIONS

A new approach to eye-safety analysis for airborne laser systems flight test and training operations by R. Sabatini and M.A. Richardson, Apr. 1, 2003, 8 pages, XP004409064.
(Continued)

*Primary Examiner* — Luke D Ratcliffe
(74) *Attorney, Agent, or Firm* — BROOKS KUSHMAN P.C.

(57) ABSTRACT

A method for continuous in-flight management of a beam generator on board an aircraft, the aircraft comprising the beam generator, sensors, a calculator and a display device. After continuously acquiring a value of at least one parameter of the beam generator and a value of at least one parameter of the aircraft by means of the sensors, a step of continuously estimating a piece of information relating to the reliability of the beam generator over a predetermined time period is carried out using the calculator, as a function, at the very least, of the successive values of the parameters of the beam generator and the aircraft as well as data from a history of the beam generator. Finally, at least one indication relating to the beam generator and depending on the piece of information is displayed on the display device.

20 Claims, 4 Drawing Sheets

(56) References Cited

U.S. PATENT DOCUMENTS

| | | | | |
|---|---|---|---|---|
| 2010/0073198 | A1 | 3/2010 | Wegner et al. | |
| 2012/0179326 | A1* | 7/2012 | Ghelam | G06F 11/008 701/31.9 |
| 2018/0088214 | A1* | 3/2018 | O'Keeffe | G01S 7/4815 |

OTHER PUBLICATIONS

A procedure for the estimation of intrabeam hazard distances and optical density requirements under the ANSI Z136.1 2000 Standard by Robert J. Thomas and Benjamin A. Rockwell, Aug. 1, 2004, 11 pages, XP05586611.

"MATILDA: A Military Laser Range Safety Tool Based on Probabilistic Risk Assessment (PRA) Techniques", published in Aug. 2014 by the United States Air Force Research Laboratory, 56 pages, under reference "AFRL-RH-FS-TR 2014 0035".

French Search Report for French Application No. FR2205114, Completed by the French Patent Office, Dated Feb. 10, 2023, 10 pages.

* cited by examiner

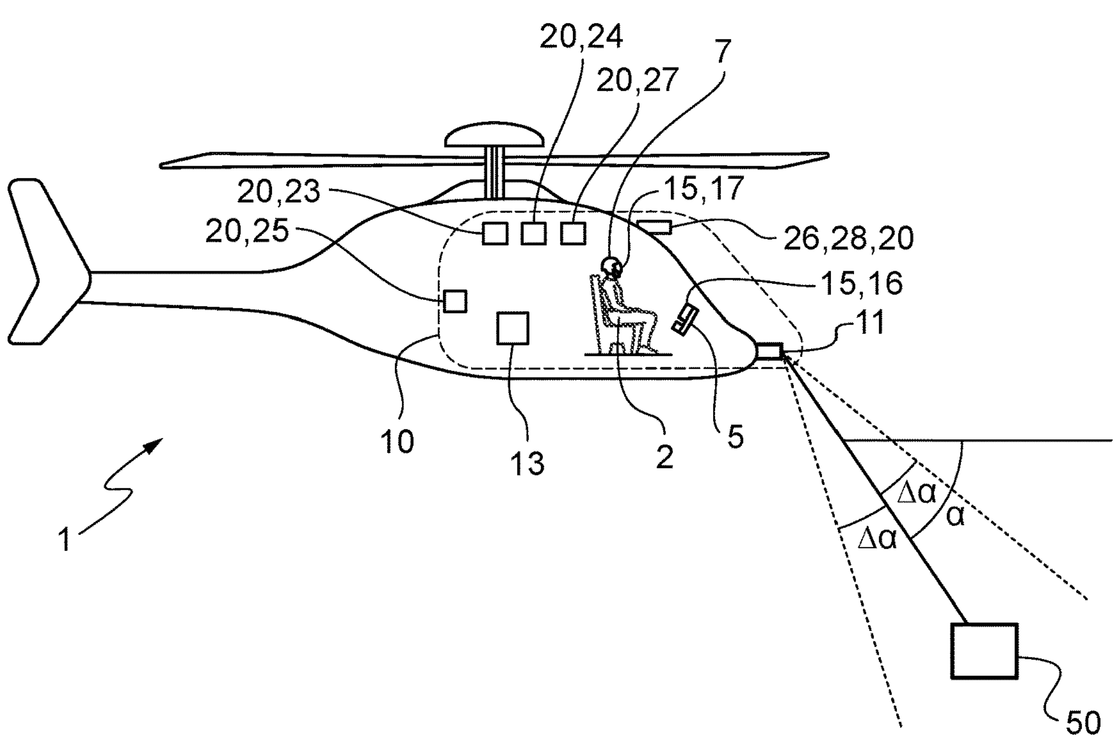
Fig.1
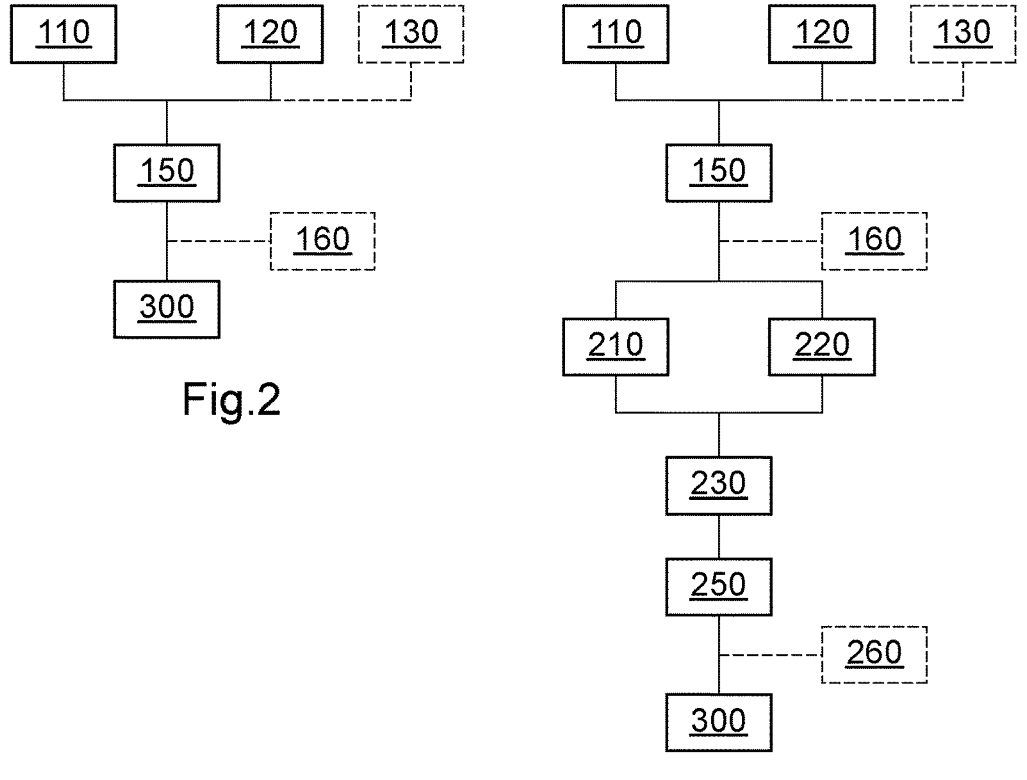
Fig.2
Fig.3

METHOD AND SYSTEM FOR CONTINUOUS IN-FLIGHT MANAGEMENT OF AN ON-BOARD BEAM GENERATOR

CROSS REFERENCE TO RELATED APPLICATIONS

This application claims priority to French patent application No. of FR 22 05114 filed on May 31, 2022, the disclosure of which is incorporated in its entirety by reference herein.

TECHNICAL FIELD

The present disclosure relates to the field of devices on board an aircraft emitting a light beam. It relates more particularly to the field of devices emitting a laser beam.

The present disclosure relates to a method for continuous in-flight management of an on-board beam generator and a system for continuous in-flight management of this on-board beam generator.

BACKGROUND

A light beam may be emitted from an aircraft in flight by an on-board beam generator and may have different uses so that it may be used for different purposes.

Such a light beam emitted from an aircraft may be used to point at an object in order to indicate that object, for example, to persons in the aircraft carrying the beam generator or indeed to persons outside the aircraft. The beam generator may then be referred to as a "pointer".

Such a beam emitted from an aircraft may also be used to illuminate a zone, for example by means of an infrared beam, in order to amplify and/or improve the vision of persons on the ground or in the air equipped with suitable vision equipment, for example at night. The beam generator may then be referred to as an "illuminator".

A light beam emitted from an aircraft may also be used to designate a target in order to guide a projectile to the designated target. This technique is referred to, for example, as "Semi-Active Laser Homing" (SALH). According to this technique and as described in document U.S. Pat. No. 4,143,835, a laser beam is kept pointed at a target by an operator. Reflected beams of this incident laser beam are then scattered in a multitude of directions by reflection off the target. A projectile may then be launched or released towards the target. When the projectile is sufficiently close to the target, a receiving device of the projectile receives part of the light beam reflected from the target. The trajectory of the projectile is then adjusted towards the target. The beam generator may then be referred to as a "designation device" or "laser designator".

A light beam emitted from an aircraft may further be used to determine a distance between the aircraft and the object pointed at by the beam. The beam generator may then be referred to as a "range finder" and uses the time taken for the light beam to reach the object and return to the beam generator after reflection off the object. Such a range finder may possibly be able to determine other characteristics of the object, such as its speed and heading.

Regardless of what it is used for, a "light beam" should be understood to mean a beam generally composed of light waves visible to the human eye. However, and by extension, a "light beam" may also denote a beam composed of invisible electromagnetic waves, with wavelengths in the infrared and ultraviolet ranges, for example.

Moreover, a light beam may be a laser beam. The term "laser" is an acronym for "Light Amplification by Stimulated Emission of Radiation". A laser beam is a particular light beam composed of coherent and concentrated light. A laser beam may therefore just as well be a light beam with a wavelength in the range visible to the human eye as in the invisible range, in particular in the infrared and ultraviolet ranges.

For the sake of simplicity, the term "beam" will be used hereinafter to refer to a light beam.

A beam, and in particular a laser beam, may be dangerous to persons inside and outside the aircraft, in particular on the ground, if it is directed at their eyes. For example, there may be persons on the ground in the vicinity of an object that is being pointed at or designated or a zone illuminated by such a beam. The zone on the ground covered by a beam and likely to be dangerous to a person is the intersection of a cone formed by the beam with the ground. This cone formed by the beam may be referred to as a "Laser Surface Danger Zone" (LSDZ).

The safety aspects relating to persons on the aircraft are usually covered by the aircraft certification or rating.

The procedures or instructions to be followed in relation to persons on the ground are usually contained in the flight manual of an aircraft with an on-board beam generator. These procedures or instructions comprise, for example, charts indicating the area of the zone covered on the ground as a function of various parameters using assumptions about some of these parameters.

Moreover, during a test, a secured zone on the ground may be identified in which no person not protected from injury by the beam may be present. This secured zone may be referred to as the "Controlled Risk Area" (CRA). The persons authorized to be in the CRA zone must be wearing suitable protective equipment such as goggles, for example. The CRA zone is determined, for example, depending on the conditions of the test, the characteristics of the beam generator and the beam, and the weather conditions.

Moreover, a beam, and a laser beam in particular, is characterized by a safety distance, which may also be referred to as the "Nominal Ocular Hazard Distance" (NOHD). A person situated at a distance further than this NOHD distance from the beam generator is not at risk of injury if the beam is directed towards his or her eyes, whereas, at distances closer than this NOHD distance, there is a risk of injury. The zone covered on the ground therefore depends on this NOHD distance.

A "Nominal Skin Hazard Distance" (NSHD) may also be calculated. A person situated at a distance closer than the NSHD distance to the beam generator is at risk of skin injury.

Before using a beam, an operator needs to know this NOHD distance in order to estimate whether there is a risk of the beam illuminating a zone on the ground in which persons may be located and also in order to estimate the dimensions of this zone covered on the ground. However, in order to be suitable for all situations, this NOHD distance is generally maximized.

For example, the NOHD distance is defined, according to a known technique, on the assumption that no atmospheric attenuation affects the beam in the air before it reaches the ground. In practice, greater or lesser atmospheric attenuation can reduce the NOHD distance, depending on the humidity level in the air and the presence of fog, dust and/or sand, for example.

Moreover, a beam may be obtained by a series of pulses emitted at regular or irregular time intervals, but these intervals are always known, especially when the beam is emitted by a designation device. In this case, the NOHD distance also depends on the duration of emission of the beam sequence. A coefficient C5 characterizes this duration of emission of the beam and its possible pulse frequency. For a beam with a single pulse, the coefficient C5 is equal to 1, whereas for a beam sequence comprising a series of pulses, the coefficient C5 is less than 1.

When the coefficient C5 is less than 1, the NOHD distance is increased.

A NOHD distance may be of the order of one kilometer for a pointer or illuminator and of the order of several tens of kilometers for a designation device.

The area of the zone covered on the ground also depends on the variation angle affecting the beam, this variation angle being a function of the beam generator and the movements of the aircraft. By assumption, the variation angle is often considered to be equal to +/−1° around a line of sight. This variation angle is, above all, a function of the stability of the aircraft in flight, the angular divergence caused by the beam generator being generally far less, in particular for a laser beam.

The area of the zone covered on the ground is furthermore a function of the height of the aircraft from the ground and the angle formed by the line of sight of the beam and a horizontal plane of a terrestrial reference frame. A horizontal plane is defined perpendicular to the direction of Earth's gravity, for example. A measurement or estimate of the height of the aircraft from the overflown ground may be provided by an instrument on the aircraft, for example a radio altimeter, this height being considered parallel to the direction of Earth's gravity. A measurement or estimate of the angle formed by the line of sight of the beam and a horizontal plane of a terrestrial reference frame may be provided, for example, by the beam generator or by a dedicated device.

The area of the zone covered on the ground is also a function of the shape of the terrain illuminated by the beam. By assumption, the terrain is generally considered to be flat and horizontal, which maximizes the zone covered on the ground.

Depending on these values of the height of the aircraft, the beam angles and these assumptions, the operator responsible for the beam generator can then obtain an estimate of the area of the zone covered on the ground as well as the NOHD distance to be applied, using charts.

The publication "A new approach to eye-safety analysis for airborne laser systems flight test and training operations" by R. Sabatini and M. A. Richardson, 1 Apr. 2003, XP004409064, describes a method for evaluating the risks associated with the use of airborne laser systems in order, in particular, to determine the surface area on the ground illuminated by the laser beam and likely to be dangerous for persons on the ground. The surface area is determined, in particular, by the NOHD distance, the "Maximum Permissible Energy" (MPE), and the characteristics of the laser beam. This method may be applied by a calculator.

Document US 2009/0273770 describes a laser imaging, detection and ranging (LiDAR) system that automatically adjusts the characteristics of the laser beam so that persons in the zone illuminated by the laser beam suffer no eye damage. For example, the distance to the targets is automatically measured in order to determine the closest targets. A laser device emits a laser beam and a controller adjusts the frequency, power and/or duration of the pulses of the laser device based on the measured distance to the closest target, in order to conform to a predefined eye-safety model.

The publication "A procedure for the estimation of intrabeam hazard distances and optical density requirements under the ANSI Z136.1-2000 Standard" by Robert J. Thomas and Benjamin A. Rockwell, 1 Aug. 2004, XP055866113, describes different approaches for estimating dangers to persons when using laser beams under the American national standard (ANSI ZI36.1). In particular, these approaches can be used to calculate the Maximum Permissible Energy MPE and the NOHD distance.

Documents FR 2 970 358, US 2010/0073198, EP 3 521 855 and U.S. Pat. No. 8,400,625 are far removed from the disclosure.

Document FR 2 970 358 describes the estimation of a time period prior to maintenance of electronic equipment on board an aircraft and is aimed at monitoring the operating condition and maintenance of this electronic equipment. The method comprises various steps carried out during the life cycle of the equipment, including steps for modelling the equipment, simulating damage to the equipment, merging damage data with relevant actual distance-to-failure data, and providing a service life prediction for the on-board electronic equipment. The method also comprises steps for measuring a physical parameter of the equipment and flight and/or performance parameters of the aircraft.

Document US 2010/0073198 describes a human-machine interface for assisting a pilot during take-off or landing of an aircraft in conditions of reduced external visibility.

The document describes an assembly comprising a glass panel that can be partially darkened and positioned in the path of a light beam generated by a laser generation system, for example a LiDAR system. A controller can control a degree of darkening of the glass panel to protect operators, for example depending on the NOHD distance.

Document U.S. Pat. No. 8,400,625 describes systems and methods for testing the line of sight of a gimbal camera and a laser system, such as an infrared countermeasure system, in extreme environments.

These documents and the procedures and instructions included in an aircraft flight manual, for example, do not take into account the potential failure of the beam generator.

However, a beam generator may be subject to failures that do not prevent a beam from being generated, but that do result in the emission of a beam that does not comply with the instructions, for example being directed in an inappropriate direction.

The document "MATILDA: A Military Laser Range Safety Tool Based on Probabilistic Risk Assessment (PRA) Techniques", published in August 2014 by the United States Air Force Research Laboratory, under reference "AFRL-RH-FS-TR-2014-0035", considers such a failure. The document describes a safety tool for military firing ranges based on techniques for the probabilistic calculation of the risk of a beam causing injury to a person on the ground, in particular eye damage.

This safety tool defines the risk in terms of a chain of events, each event having an associated probability of occurring. For example, the risk is equal to the product of a first probability of the beam being directed in an inappropriate direction, i.e., outside the intended zone, a second probability of an unprotected person being struck by the beam, and a third probability of this person struck by the beam suffering an eye injury.

SUMMARY

In this context, the aim of the present disclosure is to overcome the limitations mentioned above by making it possible to continuously estimate during flight the risk of injury to persons on the ground due to the use of the beam generator.

An object of the present disclosure is therefore a method for continuous in-flight management of a beam generator on board an aircraft and a system for continuous in-flight management of such an on-board beam generator according to the claims.

First and foremost, the object of the present disclosure is a method for continuous in-flight management of a beam generator on board an aircraft, the aircraft comprising:

the beam generator emitting a light beam;

sensors;

a calculator; and a display device.

The expression "beam generator" is to be considered in a comprehensive manner, the beam generator comprising an electro-optical assembly allowing the emission of a beam, and comprising, in particular, an emitter sub-system that emits the beam, an orientation sub-system which directs the beam towards the targeted point, a control sub-system, possibly a stabilization sub-system, etc.

This method is remarkable in that it includes the following steps:

continuously acquiring a value of at least one parameter of the beam generator by means of at least one of the sensors;

continuously acquiring a value of at least one parameter of the aircraft by means of at least one of the sensors, the at least one parameter of the aircraft being distinct from the at least one parameter of the beam generator;

continuously estimating at least one piece of information relating to the reliability of the beam generator over a predetermined time period using the calculator, as a function, at the very least, of the successive values of the at least one parameter of the beam generator and the at least one parameter of the aircraft, and data from a stored beam generator history; and displaying at least one indication relating to the beam generator on the display device, the at least one indication being dependent on the piece of information.

This method for continuous in-flight management of a beam generator on board an aircraft thus makes it possible to continuously estimate, during a flight of the aircraft, the risk of malfunction or failure of this on-board beam generator in the short term, and to display, for an operator responsible for the beam generator and/or the pilot of the aircraft, an indication that is a function of this estimated risk. A malfunction or failure of this on-board beam generator may be identified, for example, by the failure to emit a beam, by the emission of a beam carrying an energy level different from the required energy level, or by the emission of a beam in a direction different from the intended direction.

The term "continuously" refers to an action carried out continuously and at a sampling frequency. This sampling frequency may be fixed or variable. This sampling frequency may, for example, be predetermined. This sampling frequency may also be defined as a function of the capacities of the sensors to successively acquire values of parameters and/or as a function of the capacities of the calculator to successively estimate a piece of information relating to the reliability of the beam generator.

The term "continuously" can therefore be taken to mean "successively and at regular or irregular intervals".

Therefore, the values of the parameter or parameters of the beam generator and the aircraft are acquired successively and at regular or irregular intervals, using at least one sensor respectively. The values of the parameter or parameters of the beam generator and the values of the parameter or parameters of the aircraft are preferably acquired in parallel, i.e., substantially simultaneously. However, they may be acquired sequentially. Moreover, these acquisitions may begin when the aircraft is started up or when it takes off.

The parameter or parameters of the beam generator may be chosen, for example, from a temperature, an internal humidity level and a duration of use of the beam generator, as well as an amplitude of the vibrations to which the beam generator is subjected and servo data used to compensate for the vibrations and/or movements of the beam generator. The sensors comprise, for example, a temperature measuring device provided with a thermometer or thermistor, a humidity level measuring device such as a hygrometer, a device for measuring a duration of use, an inertial unit, a gyroscope or a Micro-Electro-Mechanical System or MEMS, a device for controlling the beam generator servo, these sensors being attached to the beam generator.

The parameter or parameters of the aircraft can be chosen, for example, from vibrations to which the aircraft is subjected, a load factor and an aerodynamic load of the aircraft. The sensors comprise, for example, an inertial unit or a gyroscope, these sensors being attached to the aircraft.

Each aircraft parameter is distinct from each beam generator parameter.

The piece of information relating to the reliability of the beam generator is estimated successively and at regular or irregular intervals using the calculator and as a function, at the very least, of the successive values of the parameter or parameters of the beam generator and the parameter or parameters of the aircraft, and data from a beam generator history. This history may be stored in a memory of the calculator or in a memory connected to the calculator.

The piece of information relating to the reliability of the beam generator is estimated over a predetermined time period. The expression "over a predetermined time period" means that the piece of information relating to the reliability of the beam generator is estimated from the current point in time and corresponds to a predictive reliability that is valid for the predetermined time period. This predetermined time period is preferably less than or equal to the mission time or the flight time of the aircraft.

This predetermined time period may be fixed and constant during the flight of the aircraft. This predetermined time period may also be variable or even decrease during the flight of the aircraft, the predetermined time period being equal, for example, to an initial predetermined time period from which the current flight time of the aircraft is subtracted. The initial predetermined time period is equal, for example, to the estimated time between the take-off of the aircraft and the estimated point in time of the beam emission or emissions from the beam generator.

The piece of information relating to the reliability of the beam generator is thus estimated in the short term based on the current point in time.

The beam generator history may comprise, for example, past data relating to the operation of the beam generator as a whole, i.e., the electro-optical assembly used to emit a beam. This data has been recorded during previous uses of the beam generator and/or during maintenance operations of the beam generator. This history is preferably updated to comprise all past data prior to the flight of the aircraft. This history is, for example, stored in a memory of the calculator or in a memory connected to the calculator.

This history may comprise, at the very least, for example, data relating to malfunctions and failures of the beam generator as a whole, maintenance operations carried out on the beam generator and beam emissions made by the beam generator. This history may also comprise data relating to temperatures, durations of use and amplitudes of the vibrations to which the beam generator as a whole, and the electro-optical assembly of the beam generator specifically, has been subjected. This past data is preferably date-stamped in order to be able to associate, for example, the occurrence of malfunctions or failures with the temperatures, durations of use and amplitudes of the vibrations to which the beam generator has been subjected in the past.

Finally, at least one indication relating to the beam generator and depending on the piece of information relating to the reliability of the beam generator is displayed on the display device. As a result, the pilot of the aircraft or the operator responsible for the beam generator can be made aware of the indication or indications relating to the beam generator before emitting a beam using the beam generator and can decide whether or not to effect that emission depending on the indication or indications displayed.

This method may further comprise one or more of the following features, taken individually or in combination.

According to one possibility, the piece of information relating to the reliability of the beam generator may be a short-term reliability level, the latter being a function, in particular, of the mean time between failures MTBF, which may be a theoretical mean time between failures MTBF, a nominal mean time between failures MTBF or an observed mean time between failures MTBF, and successive values of the at least one parameter of the beam generator, the at least one parameter of the aircraft, and data from a stored beam generator history.

The theoretical mean time between failures MTBF is, for example, calculated based on the reliability of all of the components of the beam generator. In general, this calculation of the theoretical mean time between failures MTBF is based on a method known as Failure Mode and Effect Critical Analysis or FMECA.

The nominal mean time between failures MTBF is a value generally provided by the manufacturer of the beam generator or a set value for a type of beam generator.

The observed mean time between failures MTBF may be an estimated value based on the number of malfunctions observed on all the equipment used. This value may be equal, for example, as a first approximation, to the total duration of use of all the equipment divided by the total number of malfunctions.

According to another possibility compatible with the preceding possibilities, the at least one indication relating to the beam generator may, for example, comprise a symbol representing a level of reliability relative to a predefined reliability threshold. To this end, the method according to the disclosure may comprise comparing the piece of information relating to the reliability of the beam generator and a predetermined reliability threshold, and the at least one indication relating to the beam generator then comprises a first symbol if the piece of information relating to the reliability of the beam generator is less than the reliability threshold and a second symbol distinct from the first symbol if the piece of information relating to the reliability of the beam generator is greater than the reliability threshold. When the piece of information relating to the reliability of the beam generator is equal to the reliability threshold, the at least one indication relating to the beam generator may comprise the first or the second symbol, depending on the chosen value of the reliability threshold.

Therefore, by virtue of the first or second displayed symbol, the pilot of the aircraft or the operator responsible for the beam generator can quickly see whether the piece of information relating to the reliability of the beam generator is less than or greater than the predetermined reliability threshold and therefore whether a beam can be emitted in a reliable manner. For example, if the second symbol is displayed, the pilot of the aircraft or the operator responsible for the beam generator knows that the beam generator is reliable and that the risk of failure or malfunction when emitting a beam is low.

Conversely, if the first symbol is displayed, the pilot of the aircraft or the operator responsible for the beam generator knows that the risk of failure or malfunction when emitting a beam is high and that it may be preferable not to command the emission of a beam.

The first symbol may, for example, be a red indicator light or a red cross. The second symbol may, for example, be a green indicator light or a green disk.

According to another possibility compatible with the preceding possibilities, the method according to the disclosure may comprise acquiring at least one parameter of the environment of the aircraft by means of at least one of the sensors, the at least one parameter of the environment being chosen from a temperature of the air outside the aircraft, an atmospheric pressure outside the aircraft, a humidity level of the air outside the aircraft. The piece of information relating to the reliability of the beam generator is then also estimated as a function of the at least one parameter of the environment, in addition to the parameters already mentioned.

According to another possibility compatible with the preceding possibilities, the step of continuously estimating the piece of information relating to the reliability of the beam generator over a predetermined time period, using the calculator, may be carried out using a law or may be carried out using an artificial intelligence. This law may comprise, for example, an equation or a system of several equations. For example, this law has been defined in advance by a theoretical calculation or empirically, in particular using the history of malfunctions and failures of identical or similar beam generators and the characteristics and parameters of those beam generators. The artificial intelligence comprises, for example, a neural network fed with the data from the history.

According to another possibility compatible with the preceding possibilities, the aircraft may comprise a tracking device and the method according to the disclosure may comprise the following steps:

- determining a position of the aircraft, using the tracking device;
- determining parameters of the beam, the parameters of the beam being distinct from the at least one parameter of the beam generator and the at least one parameter of the aircraft;
- determining a NOHD distance relative to the light beam as a function of the parameters of the beam, using the calculator; and
- determining at least one value relating to the risk of injury likely to be caused by the beam generator in at least one zone on the ground, as a function of the position of the aircraft, the NOHD distance, the parameters of the beam and the piece of information relating to the reliability of the beam generator, using the calculator,
- at the time of the displaying step, the at least one indication relating to the beam generator is a function of the at least one value relating to the risk of injury associated with the at least one zone on the ground.

In this way, the method makes it possible to inform the pilot or operator responsible for the beam generator of the risk of injury by the beam to unprotected persons who may be on the ground in one or more zones.

Typically, such a zone may be an area on the ground which the distance from the beam generator is shorter than the NOHD distance and outside a CRA zone when it is defined during a test or training exercise, for example.

The tracking device may comprise an inertial unit and/or a location receiver of a satellite positioning system for determining a position of the aircraft in a terrestrial reference frame, for example in the form of coordinates of latitude, longitude and altitude relative to a reference level, which is typically sea level. The tracking device may also comprise a device for measuring a height of the aircraft relative to the overflown ground, such as a radio altimeter, for example.

The NOHD distance relative to the light beam may be calculated using the calculator, as a function of the parameters of the beam, according to various methods, for example one of the methods described in document FR 2 104 570, the publication "A new approach to eye-safety analysis for airborne laser systems flight test and training operations" by R. Sabatini and M. A. Richardson, 1 Apr. 2003, XP004409064, or the publication "A procedure for the estimation of intrabeam hazard distances and optical density requirements under the ANSI Z136.1-2000 Standard" by Robert J. Thomas and Benjamin A. Rockwell, 1 Aug. 2004, XP055866113.

The parameters of the beam that can be used to determine the NOHD distance may, for example, comprise several of the following parameters:

a coefficient C5 relating to a duration of emission of the beam and its possible pulse frequency; and an attenuation coefficient of the light beam in air.

At least one value relating to the risk of injury may then be calculated with the calculator for at least one zone on the ground. This at least one value relating to the risk of injury may be the probability of an injury occurring in the at least one zone. Alternatively, this at least one value relating to the risk of injury may be a density per unit surface area of risk of injury in the at least one zone on the ground, this density per unit surface area being evaluated over a set of points lying within the at least one zone on the ground.

This or these values relating to the risk of injury are, for example, proportional to the product of several factors that depend, in particular, on the position of the aircraft, the NOHD distance, the parameters of the beam and the piece of information relating to the reliability of the beam generator.

A first factor relates to the emission of a beam in the wrong direction due to a failure of the beam generator. This first factor depends, for example, on the piece of information relating to the reliability of the beam generator and possibly on the duration of emission of the beam.

A second factor relates to the risk of the beam striking a person on the ground. This second factor depends, for example, on the duration of emission of the beam, the number of pulses of the beam, the coefficient C5 and/or the NOHD distance, and the area of the zone on the ground covered by the beam.

A third factor relates to the severity of the injury caused to a person on the ground struck by the beam.

In order to limit the resources used by the calculator, the at least one value relating to the risk of injury is determined only for one or more zones on the ground situated at a distance from the beam generator less than or equal to the NOHD distance. This is because, beyond the NOHD distance, persons on the ground are not at risk of injury, even if they are not equipped with suitable protective equipment.

According to another possibility compatible with the preceding possibilities, the at least one value relating to the risk of injury may also be determined as a function of a population density in the zone of interest of the one or more zones on the ground, the population density being stored in a memory of the calculator or in a memory connected to the calculator. The population density may, for example, be taken into account in the second factor.

According to another possibility compatible with the preceding possibilities, the at least one indication relating to the beam generator may comprise the at least one value relating to the risk of injury associated with the at least one zone on the ground.

According to another possibility compatible with the preceding possibilities, the at least one indication relating to the beam generator may comprise at least one zone on the ground and an indicator that is a function of the at least one value relating to the risk of injury associated with the at least one zone on the ground.

According to another possibility compatible with the preceding possibilities, at least one specific zone of the one or more zones on the ground may be predefined, and the method may then comprise transmitting an alert message if the value relating to the risk of injury associated with one of the one or more zones on the ground that is distinct from the at least one specific zone is greater than a predefined risk threshold.

The object of the present disclosure is also a system for continuous in-flight management of a beam generator on board an aircraft, the system comprising:

the beam generator emitting a light beam;

sensors;

a calculator; and a display device.

This system for continuous in-flight management of an on-board beam generator is configured to implement the method described above.

BRIEF DESCRIPTION OF THE DRAWINGS

The disclosure and its advantages appear in greater detail in the context of the following description of embodiments given by way of illustration and with reference to the accompanying figures, in which:

FIG. 1 shows an aircraft provided with a system for continuous in-flight management of a beam generator on board an aircraft according to the disclosure;

FIG. 2 shows an overview diagram of a method for continuous in-flight management of a beam generator on board an aircraft according to the disclosure;

FIG. 3 shows an overview diagram of a method for continuous in-flight management of a beam generator on board an aircraft according to the disclosure;

DETAILED DESCRIPTION

Figure 4:
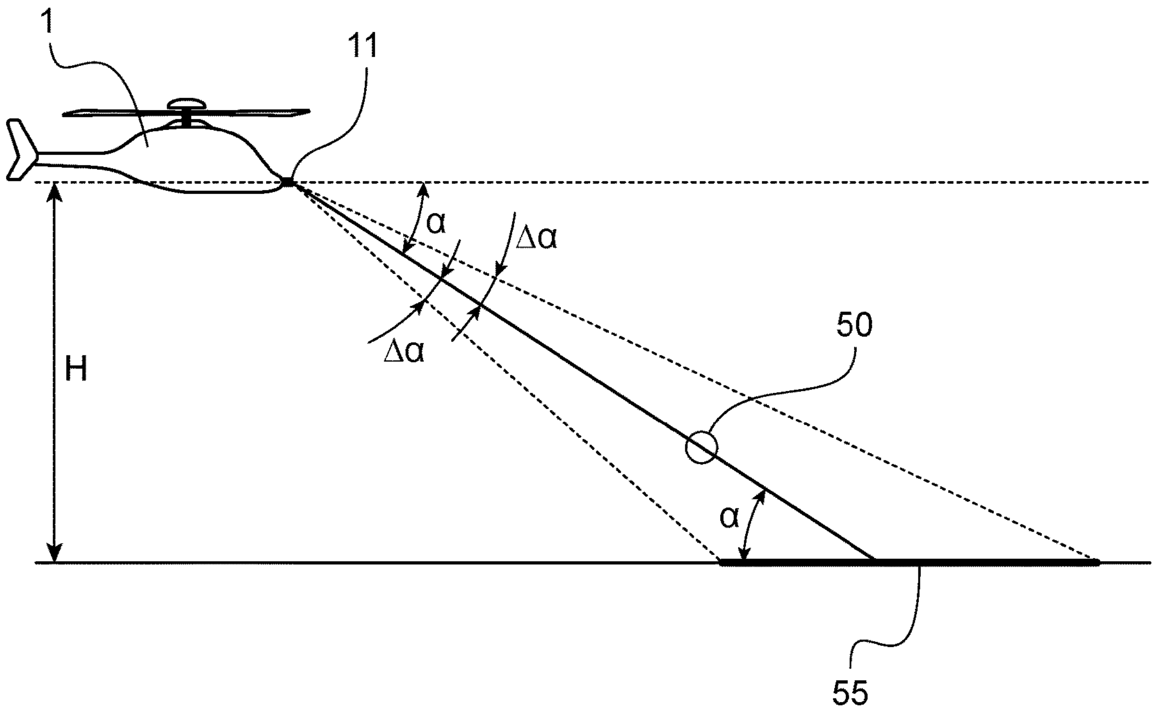
FIG. 4 shows a diagram representing a zone on the ground likely to normally be covered by the beam.

Elements that are present in more than one of the figures are given the same references in each of them.

FIG. 1 shows an aircraft 1 provided with a system 10 for continuous in-flight management of a beam generator 11 on board the aircraft 1. This system 10 comprises the beam generator 11 emitting the light beam, sensors 20, a calculator 13 and at least one display device 15.

A display device 15 may be a screen 16 arranged on an instrument panel 5 of the aircraft 1. The display device 15 may also be integrated into a helmet 7 of an operator 2 responsible for the beam generator 11, and project images onto a visor 17 of the helmet 7. The visor 17 is transparent or semi-transparent and allows a direct view of the landscape outside the aircraft 1. The display device 15 therefore allows images to be displayed on the visor 17, overlaid on this direct view of the landscape outside the aircraft 1. The display device 15 may also be part of the windshield of the aircraft 1 or a digital tablet on board the aircraft 1, or any other display means.

The beam generator 11 may be used by the operator 2 to direct a beam towards an object 50 in order to point at the object or, for example, to designate it as a target for a projectile guided towards the object 50 by the beam. The object 50 may be on the ground, for example a vehicle or building, or in the air, for example an aircraft.

The beam generator 11 may also be used by the operator 2 to direct a light beam towards a zone in order to illuminate that zone, for example to amplify and/or improve the vision persons equipped with suitable vision equipment have of that zone, for example at night.

The light beam may or may not be visible to the human eye, depending on the wavelength or wavelengths of the beam. The beam may comprise a series of light pulses or may be a continuous beam.

By way of example, the calculator 13 may comprise at least one processor and at least one memory, at least one integrated circuit, at least one programmable system, or at least one logic circuit, these examples not limiting the scope to be given to the term "calculator". The term "processor" may refer equally to a central processing unit (CPU), a graphics processing unit (GPU), a digital signal processor (DSP), a microcontroller, etc.

The system 10 may comprise one or more sensors 20, such as measuring instruments, detecting element or cameras, transmitting analog or digital signals in electrical or optical form to the calculator 13. The calculator 13 is connected via a wired or wireless link to the beam generator 11 and may also be connected via a wired or wireless link to each sensor 20. The beam generator 11 may also be connected via a wired or wireless link to each sensor 20.

The term "sensor" denotes a physical detecting element capable of directly measuring the parameter in question but also a system that may comprise one or more physical detecting elements, and possibly one or more cameras, as well as means for processing the signal or the image that make it possible to provide an estimation of the parameter from the measurements or images provided by these physical detecting elements. Similarly, the expression "measuring the parameter" refers to both a raw measurement from a sensor and a measurement obtained by relatively complex processing of raw measurement signals.

For example, the sensors 20 may comprise an inertial unit 23 and/or a location receiver 24 of a satellite positioning system. The inertial unit 23 and/or the location receiver 24 may also be integrated into the beam generator 11 in order to determine the movements of the beam generator 11 characterizing its stability, and a beam aiming angle $\alpha$. This aiming angle $\alpha$ is defined between the line of sight, i.e., the direction followed by the beam, and, for example, a horizontal plane perpendicular to the direction of Earth's gravity.

The inertial unit 23 may in particular measure angular accelerations from which the movements of the aircraft 1 and the beam generator 11 may be deduced. The location receiver 24 provides a position of the aircraft 1, for example in the form of coordinates in a terrestrial reference frame, the variations in this position defining the movements of the aircraft 1 and the beam generator 11.

Knowing the movements of the beam generator 11 in isolation from the movements of the aircraft 1 makes it possible to deduce a beam variation angle by adding the angular deviation caused by the movements of the aircraft 1 in flight to the angular divergence caused by the beam generator 11 itself. However, the component caused by the beam generator 11 is minor compared to the component caused by the movements of the aircraft 1, and may possibly be disregarded. The variation angle $\Delta\alpha$ of the beam is defined to either side of the line of sight.

The sensors 20 may comprise an electro-optical system 25 for measuring the stability of the beam generator 11 and deriving from it the variation angle $\Delta\alpha$ of the beam.

The sensors 20 may comprise at least one image capture device 26, such as a camera or a photographic device, on board the aircraft 1. By processing several images captured successively by an image capture device 26, the calculator 13 can be used to determine the movements of the beam on the object 50, and to deduce therefrom the variation angle $\Delta\alpha$ of the beam.

The sensors 20 may comprise a radio altimeter 27 measuring a height H of the aircraft 1, in a vertical direction parallel to the direction of Earth's gravity, in relation to the overflown ground.

The sensors 20 may comprise a LiDAR sensor 28 for scanning the environment of the aircraft 1 with a laser beam and detecting objects, obstacles and the relief of the terrain. Depending on the information provided by the LiDAR sensor 28, the calculator 13 can then produce a three-dimensional model of the terrain in substantially real time. The calculator 13 may also carry out such three-dimensional modelling of the terrain in substantially real time using images provided by an image capture device 26, if the latter is stereoscopic, or using images from two image capture devices 26. A three-dimensional model of the terrain may also be stored in a memory connected to or integrated with the calculator 13, for example in the form of a terrain database.

The system 10 is configured to implement a method for continuous in-flight management of the beam generator 11 on board the aircraft 1, a block diagram of which is shown in FIG. 2. This method for continuous in-flight management of the beam generator 11 comprises the following steps.

First of all, a value of at least one parameter of the beam generator 11 is acquired continuously during an acquisition step 110 using at least one of the sensors 20. A parameter of the beam generator 11 may, for example, be a temperature of the beam generator 11, a duration of use of the beam generator 11, vibrations or servo data of the beam generator 11.

A value of at least one parameter of the aircraft 1 is continuously acquired during an acquisition step 120, by means of at least one of the sensors 20, the at least one parameter of the aircraft 1 being distinct from the at least one parameter of the beam generator 11. A parameter of the aircraft 1 may, for example, be an amplitude of vibrations, a load factor, an acceleration, a payload and a total mass of the aircraft 1.

These two acquisition steps 110, 120 are preferably carried out in parallel. However, these two acquisition steps 110, 120 may also be carried out in alternation, for example one after the other.

The method may also optionally comprise a step 130 of acquiring at least one parameter of the environment of the aircraft 1 using at least one of the sensors 20. A parameter of the environment may, for example, be a temperature, an atmospheric pressure or a humidity level of the air outside the aircraft 1 and measured in the vicinity of the aircraft 1.

This acquisition step 130 is preferably carried out in parallel to the two acquisition steps 110, 120. However, this acquisition step 130 may also be carried out in alternation with the two acquisition steps 110, 120.

Next, the calculator 13 is configured to continuously estimate a piece of information relating to the reliability of the beam generator 11 over a predetermined time period, during an estimation step 150, depending, at the very least, on the successive values of the parameter or parameters of the beam generator 11 and the parameter or parameters of the aircraft 1, data from a history of the beam generator 11, as a whole, and possibly successive values of the parameter or parameters of the environment. The beam generator history comprises past data relating to the operation of the beam generator 11, its use and its past maintenance operations. The history is stored in a memory connected to or integrated into the calculator 13, for example. The history is updated at the end of each flight or as the flight progresses, for example.

This piece of information relating to the reliability of the beam generator 11 over a predetermined time period is, for example, estimated using a predetermined law or using an artificial intelligence.

The piece of information relating to the reliability of the beam generator 11 may be a short-term reliability level of the beam generator 1, which may depend on a theoretical, nominal or observed mean time between failures MTBF and/or successive values of the parameters of the beam generator 11, the parameters of the aircraft 1, and data from a stored history of the beam generator 11.

Furthermore, the acquisition steps 110, 120 or 130 and the step 150 of estimating the piece of information relating to the reliability of the beam generator 11 over a predetermined time period are carried out continuously, i.e., successively and at regular or irregular intervals.

Finally, at least one indication relating to the beam generator 11 is displayed on the display device 15 during a display step 300. The indication or indications depend on the piece of information relating to the reliability of the beam generator 11 over a predetermined time period. The pilot of the aircraft 1 or the operator 2 is thus aware of this indication relating to the beam generator 11. The pilot of the aircraft 1 or the operator 2 can thus use the beam generator 11 in the knowledge of this indication that takes into account a risk of failure of the beam generator 11.

An indication relating to the beam generator 11 may be the piece of information relating to the reliability of the beam generator 11 displayed on the display device 15 itself. The display device 15 may therefore display a value of the short-term reliability level.

Alternatively, or additionally, the at least one indication relating to the beam generator 11 may also comprise symbols displayed, for example, as a function of the piece of information relating to the reliability of the beam generator 11 and a predetermined reliability threshold so that the pilot of the aircraft 1 or the operator 2 can quickly see whether a beam can be emitted by the beam generator 11 without risk of failure of the beam generator 11. To this end, the method of the disclosure may optionally comprise comparing 160 the piece of information relating to the reliability of the beam generator 11 and this reliability threshold.

Then, during the display step 300, a first symbol is displayed on the display device 15 if the piece of information relating to the reliability of the beam generator 11 is less than the reliability threshold, the risk of failure of the beam generator 11 then being greater than a predetermined risk level. Conversely, a second symbol distinct from the first symbol is displayed on the display device 15 if the piece of information relating to the reliability of the beam generator 11 is greater than the reliability threshold, the risk of failure of the beam generator 11 then being less than the predetermined risk level. When the piece of information relating to the reliability of the beam generator 11 is equal to the reliability threshold, the first or second symbol is displayed, depending on the chosen value of the reliability threshold.

The first symbol is, for example, a red indicator light or the message “No Go”, meaning that the risk of malfunction is greater than the predetermined risk level. The second symbol is, for example, a green indicator light or the message “Go”, meaning that the risk of malfunction is less than the predetermined risk level.

The system 10 may also be configured to implement a method for continuous in-flight management of the beam generator 11 on board the aircraft 1 in order, in particular, to estimate the risk of injury to persons on the ground based on the estimated reliability of the beam generator 11. An overview diagram of this method is shown in FIG. 3.

Figure 5:
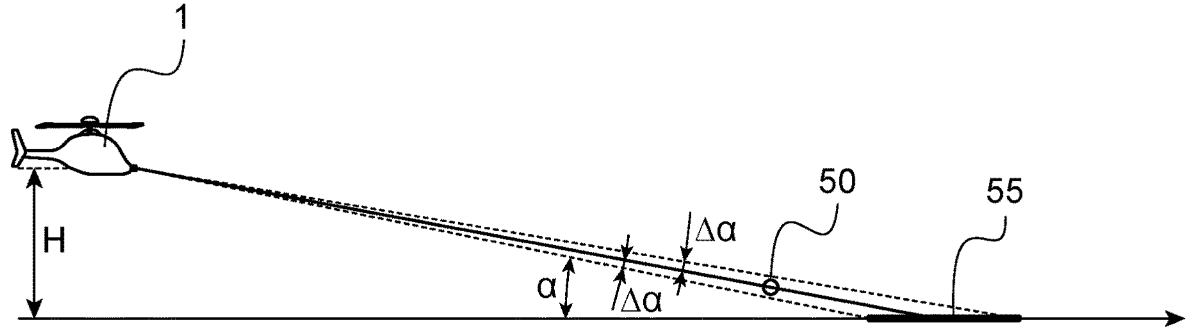
FIG. 5 shows a diagram representing a zone on the ground likely to normally be covered by the beam.

If the beam generator 11 is operating correctly, the direction of emission of a beam is located within a cone with known and relatively restricted limits. The beam can thus impact the ground in an impact zone 55, as shown in FIGS. 4 and 5.

Figure 6:
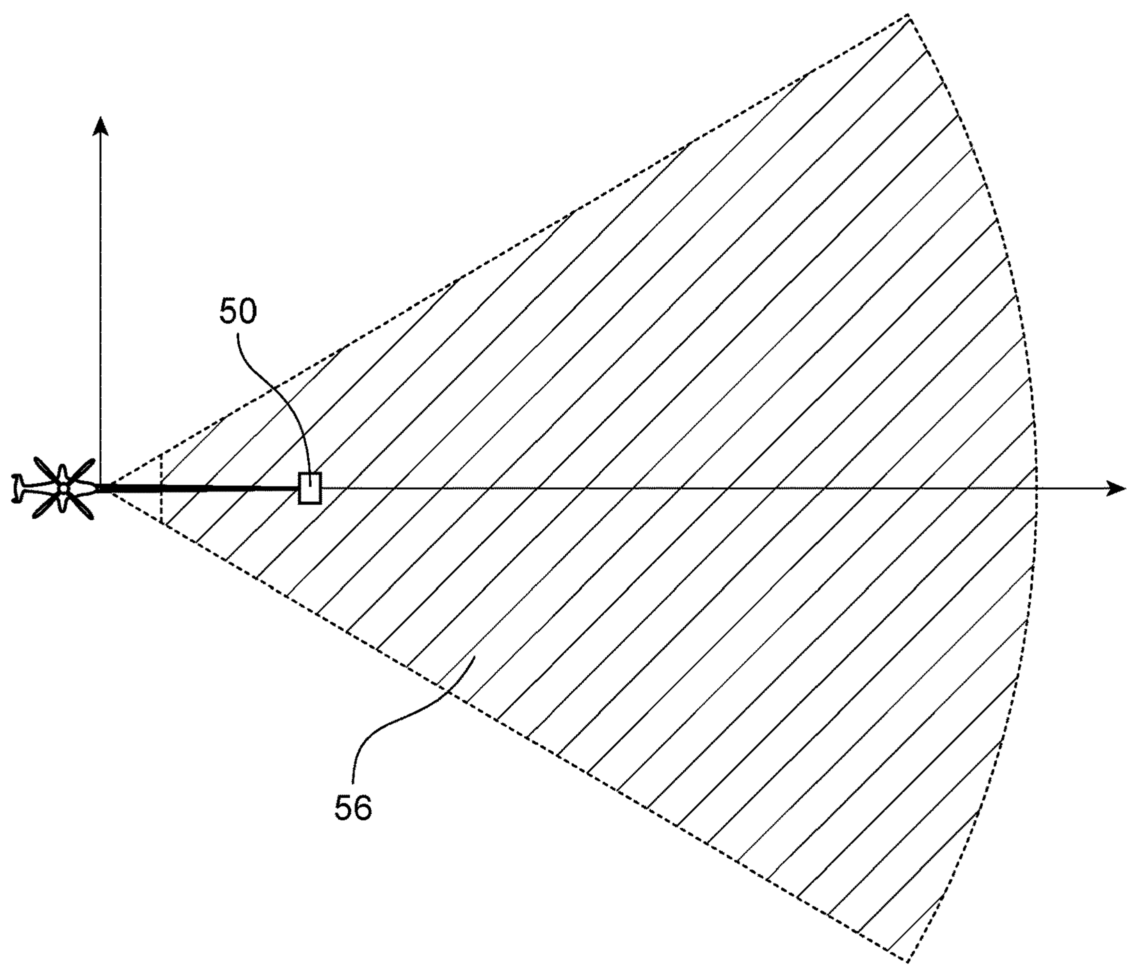
FIG. 6 shows a diagram representing a zone on the ground likely to actually be covered by the beam in the event of failure of the beam generator.
Figure 7:
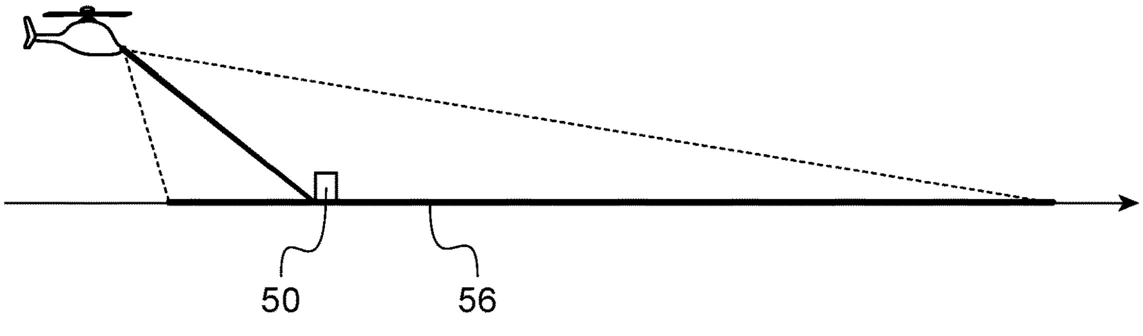
FIG. 7 shows a diagram representing a zone on the ground likely to actually be covered by the beam in the event of failure of the beam generator.

In the event of failure of the beam generator 11, the beam may follow a direction very different and relatively far from the intended direction, as shown in FIGS. 6 and 7. The beam may then impact the ground over a much larger zone than intended. As a result, unprotected persons situated outside the intended impact zone 55 may be struck by the beam and possibly injured.

This method for continuous in-flight management of the beam generator 11 may comprise the following steps in addition to the steps 110-150 and 300 described above.

Firstly, a position of the aircraft 1 may be determined during a determination step 210 performed with a tracking device, for example the radio altimeter 27, the inertial unit 23 or the location receiver 24. This position of the aircraft 1 may comprise, for example, the height of the aircraft 1 relative to the ground and/or the coordinates of the aircraft 1 in a terrestrial reference frame.

Beam parameters may be determined during a determination step 220 performed using sensors 20, the beam parameters being distinct from the parameter or parameters of the beam generator 11 and the parameter or parameters of the aircraft 1. The beam parameters may, for example, comprise the coefficient C5, an attenuation coefficient of the beam in air, a beam aiming angle and/or a beam variation angle.

The determination steps 210, 220 may be carried out after the estimation step 150. The determination steps 210, 220 may also be carried out in parallel with the acquisition steps 110, 120.

Following the determination steps 210, 220, a NOHD distance relative to the beam may be determined during a determination step 230 based on the beam parameters, the calculator 13 being configured to determine this NOHD distance.

This NOHD distance may, for example, be determined by solving the following equation iteratively or by other known methods, having previously defined a value for the energy threshold MPE:

$$MPE = \left[\frac{4.\ P_T}{\pi.\ (D_T + \theta_B.\ NOHD)^2}\right].\ e^{-\sigma_w.\ NOHD};$$

where:

MPE is the energy threshold;

NOHD is the safety distance referred as "Nominal Ocular Hazard Distance";

$\sigma_w$ is the attenuation coefficient;

$P_T$ is the initial energy of the beam;

$D_T$ is the diameter of the laser beam at the beam generator 11;

$\theta_B$ is the divergence angle of the beam due to the beam generator 11; and π, is Archimedes' constant.

The value of the energy threshold MPE is the value above which the beam is likely to cause injury to the eyes of a person struck by the beam. The value of the energy threshold MPE may be defined by means of tables accompanying beam safety standards. These tables may be stored in a memory connected to or integrated into the calculator 13, for example.

The calculator 13 is then configured to determine at least one value relating to the risk of injury likely to be caused by the beam generator 11 in at least one zone on the ground during a determination step 250, as a function of the position of the aircraft, the NOHD distance, the parameters of the beam and the piece of information relating to the reliability of the beam generator 11.

The at least one value relating to the risk of injury may be equal to a probability of injury or a density per unit surface area of risk of injury.

The value relating to the risk of injury is, for example, proportional to the product of the following factors.

A first factor relates to the emission of a beam in the wrong direction following a failure of the beam generator 11, for example. The calculator 13 is configured to estimate or determine the first factor based on the piece of information relating to the reliability of the beam generator and possibly the duration of emission of the beam and/or the coefficient C5 and the NOHD distance. It may be noted that the first factor is zero for any point on the ground that is at a distance greater than the NOHD distance from the beam generator 11.

Furthermore, when a CRA zone on the ground has been defined prior to the emission of a beam by the beam generator 11, the first factor may be estimated or determined also according to a probability of the beam being emitted outside the CRA zone, in addition to the parameters already discussed. For example, when the CRA zone is defined by the intersection with the ground of a sphere of radius R centered on the beam generator 11 on board the aircraft 1, this probability is equal to $$\frac{\pi.\ NOHD^2 - \pi.\ R^2}{\pi.\ NOHD^2}$$

for a NOHD distance greater than the radius R.

For other shapes of the CRA zone on the ground, a specific algorithm may be defined to calculate this probability.

A second factor relates to the risk of the beam striking a person on the ground. The calculator 13 is configured to estimate or determine the second factor as a function of the duration of emission of the beam, the number of pulses of the beam and/or the coefficient C5, as well as the area of the zone on the ground likely to be covered by the beam.

Additionally, the second factor may be estimated or determined also on the basis of the beam direction, in particular if this beam direction is not stable. The movements or stability of this beam direction may be determined using one or more sensors for example the electro-optical system 25 and/or the at least one image capture device 26.

Additionally, the second factor may be determined also on the basis of a population density in the zone of interest. This population density may be stored in a memory connected to or integrated into the calculator 13. The greater the population density in a zone, the greater the risk of injury to a person if a beam reaches this zone.

A third factor relates to the severity of the injury caused to a person on the ground struck by the beam. This third factor is usually predefined and constant. The third factor is equal to 1, for example.

An example of the calculation of a value relating to the risk of injury and, in particular, the probability of injury, is now described, assuming that the mean time between failures MTBF for the beam generator 11 as a whole, i.e., the electro-optical assembly used to emit a beam, is equal to 200 hours, the duration of emission of the beam is 30 seconds, its frequency is 20 Hertz and its divergence angle is 0.2 milliradian, the distance covered by the beam before reaching the ground being 30 kilometers. A rate of failure of the beam generator 11 may be estimated by the inverse of the mean time between failures MTBF expressed in seconds, i.e., $1.38889 \cdot 10^{-6}\ s^{-1}$.

The first factor is then equal to the product of this rate of failure and the duration of emission of the beam, the probability of the beam being emitted outside the CRA zone being considered to be equal to 1. The first factor is then equal to $4.16667 \cdot 10^{-5}$.

In order to calculate the second factor, it is necessary to determine the area on the ground likely to be covered by the beam. For one beam pulse, this area is equal to 28.2743 $m^2$. Assuming that the operator 2 will realize that the beam is being emitted in the wrong direction due to a failure of the beam generator 11 and will stop the emission of the beam after 2 seconds, 40 pulses will have been emitted. The total area on the ground likely to be covered by the beam over these 40 pulses is therefore 1130.97 $m^2$. Since the population density in the zone of interest is 10,000 inhabitants per square kilometer, the second factor is equal to this total area multiplied by the population density expressed in inhabitants per square meter, i.e., 11.3097 persons in the zone in question, these persons being likely to be exposed.

The third factor is considered to be equal to 1.

The probability of injury can then be estimated by the product of these three factors and is equal to 0.00047123, according to this example.

Finally, during the displaying step 300, the at least one indication relating to the beam generator 11 may comprise the value relating to the risk of injury associated with the at least one zone on the ground.

An indication relating to the beam generator 11 may, for example, comprise the value of the probability of injury associated with the at least one zone on the ground, i.e., 0.00047123 for the example calculation shown.

The pilot or operator responsible for the beam generator 11 may thus be aware of the existence of a risk of injury by the beam to unprotected persons who may be on the ground in one or more zones.

The at least one indication relating to the beam generator 11 may also comprise an indicator dependent on the at least one value relating to the risk of injury. For example, this indicator may comprise a symbol representing a level of the value relating to the risk of injury in a zone relative to a predefined risk threshold. To this end, the method of the disclosure may optionally comprise a step 260 of comparing the value relating to the risk of injury associated with each zone on the ground and a predetermined risk threshold. The at least one indication relating to the beam generator 11 then comprises a third symbol if the value relating to the risk of injury is less than the risk threshold and a fourth symbol distinct from the third symbol if the value relating to the risk of injury is greater than the risk threshold. When this value relating to the risk of injury is equal to the risk threshold, the third or fourth symbol is displayed, depending on the chosen value of the risk threshold.

The third symbol is, for example, a green indicator light or the message "Go", meaning that the risk of injury is less than the predetermined risk threshold. The fourth symbol is, for example, a red indicator light or the message "No Go", meaning that the risk of injury is greater than the predetermined risk threshold.

Therefore, by virtue of the third or fourth displayed symbol, the pilot of the aircraft or the operator responsible for the beam generator 11 can quickly see whether the value relating to the risk of injury is less than or greater than the predetermined risk threshold and therefore whether a beam can be emitted in a reliable manner with a risk of injury to a person on the ground lower than the predetermined risk threshold.

Furthermore, at least one specific zone of the one or more zones on the ground may be predefined, this specific zone comprising, for example, a CRA zone in which a beam is emitted and in which no unprotected person should be present. Therefore, if the value relating to the risk of injury associated with a zone on the ground distinct from the specific zone is greater than a predefined risk threshold, an alert message is issued in order to warn the pilot or the operator 2 of this risk of injury outside the CRA zone.

Moreover, one or more risk thresholds may be predefined and the step 250 of determining a value relating to the risk of injury may comprise a sub-step in which the calculator 13 calculates the dimensions of one or more specific zones based on the position of the aircraft 1, the NOHD distance, the beam parameters, a value relating to the risk of injury associated with each specific zone and a predefined risk threshold, the value relating to the risk of injury associated with the specific zone being greater than a predefined risk threshold, for example.

Figure 8:
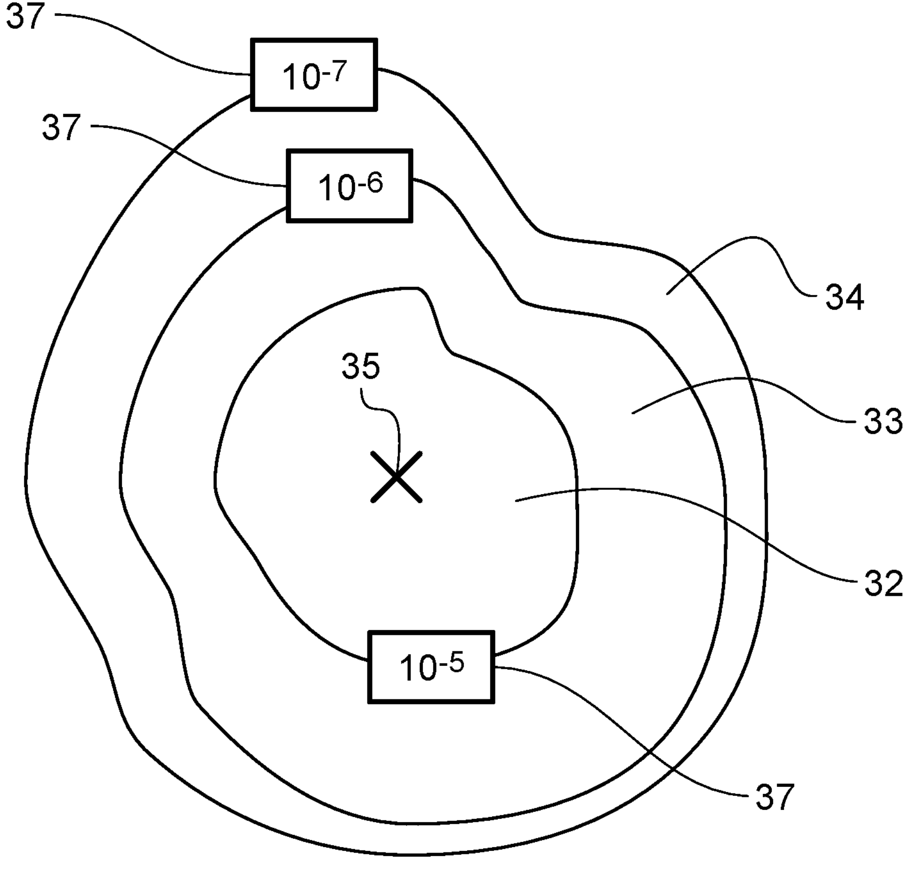
FIG. 8 shows an image of a density per unit surface area of risk of injury caused by the beam generator displayed on a display device of the aircraft.

According to the example shown in FIG. 8, several zones 32, 33, 34 are displayed along with values 37 of densities per unit surface area of risk of injury associated with each of the lines bounding these zones 32, 33, 34. These lines thus correspond to level lines with which the values 37 of densities per unit surface area of risk of injury are respectively associated. Therefore, in zone 32, the density per unit surface area of risk of injury is greater than $10^{-5}$ per $km^2$, while the density per unit surface area of risk of injury is between $10^{-6}$ and $10^{-5}$ per $km^2$ in zone 33. In zone 34, the density per unit surface area of risk of injury is between $10^{-7}$ and $10^{-6}$ per $km^2$.

Alternatively, or in addition to the level lines relating to the density per unit surface area of risk, colored zones or graded color zones may be displayed between these level lines in order to indicate the change in density per unit surface area of risk. For example, zone 34 may be displayed in green to indicate a density per unit surface area of risk of less than $10^{-7}$ per $km^2$, zone 33 may be displayed in orange to indicate a density per unit surface area of risk of between $10^{-7}$ and $10^{-6}$ per $km^2$ and zone 32 may be displayed in red to indicate a density per unit surface area of risk of more than $10^{-5}$ per $km^2$.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A method for continuous in-flight management of a beam generator on board an aircraft, the aircraft comprising:
- the beam generator emitting a light beam;
- sensors;
- a calculator;
- a display device; and
- a tracking device, the method comprising the following steps:
- continuously acquiring a value of at least one parameter of the beam generator by means of at least one of the sensors;
- continuously acquiring a value of at least one parameter of the aircraft by means of at least one of the sensors, the parameter(s) of the aircraft being distinct from the parameter(s) of the beam generator;
- continuously estimating at least one piece of information relating to the reliability of the beam generator over a predetermined time period using the calculator, as a function of successive values of the parameter(s) of the beam generator, successive values of the parameter(s) of the aircraft, and data from a stored history of the beam generator; and
- displaying at least one indication relating to the beam generator on the display device, the indication(s) being dependent on the piece of information, wherein the method comprises the following steps:
- determining a position of the aircraft, using the tracking device;
- determining parameters of the light beam, the parameters of the light beam being distinct from the parameter(s) of the aircraft and the parameter(s) of the beam generator;
- determining a Nominal Ocular Hazard Distance (NOHD) relative to the light beam as a function of the parameters of the light beam, using the calculator; and determining at least one value relating to the risk of injury likely to be caused by the beam generator in at least one zone on the ground, as a function of the position of the aircraft, the NOHD, the parameters of the light beam and the piece of information relating to the reliability of the beam generator, using the calculator, at the time of the displaying step, the indication(s) relating to the beam generator is/are a function of the value(s) relating to the risk of injury associated with the zone(s) on the ground.

2. The method according to claim 1, comprising acquiring at least one parameter of the environment of the aircraft by means of at least one of the sensors, the parameter(s) of the environment being chosen from a temperature of the air outside the aircraft, an atmospheric pressure outside the aircraft, a humidity level of the air outside the aircraft, the step of estimating the piece of information relating to the reliability of the beam generator also being made as a function of the parameter(s) of the environment.

3. The method according to claim 1, wherein the parameter(s) of the beam generator is/are selected from temperature, duration of use, vibrations and servo data of the beam generator, and the parameter (s) of the aircraft comprise(s) a vibration or a load factor of the aircraft.

4. The method according to claim 1, wherein the history of the beam generator comprises, at least, data relating to malfunctions and failures of the beam generator, maintenance operations performed on the beam generator, durations of use of the beam generator and light beam emissions made by the beam generator.

5. The method according to claim 1, wherein the history of the beam generator comprises at least data relating to malfunctions and failures of the beam generator, the piece of information relating to the reliability of the beam generator is a short-term reliability level, depending on a mean time between failures and on the successive values of the parameter(s) of the beam generator, the successive values of the parameter(s) of the aircraft and the data from a stored history of the beam generator.

6. The method according to claim 1, wherein the indication(s) relating to the beam generator comprise(s) the piece of information relating to the reliability of the beam generator.

7. The method according to claim 1, wherein the estimation is made using a law or is made using an artificial intelligence.

8. The method according to claim 1, comprising comparing the piece of information relating to the reliability of the beam generator and a predetermined reliability threshold, and the indication(s) relating to the beam generator comprise(s) a first symbol if the piece of information relating to the reliability of the beam generator is less than the reliability threshold and a second symbol distinct from the first symbol if the piece of information relating to the reliability of the beam generator is greater than the reliability threshold.

9. The method according to claim 1, wherein the value(s) relating to the risk of injury is/are determined also as a function of a population density in the zone of interest of the one or more zones on the ground, the population density being stored in a memory of the calculator or in a memory connected to the calculator.

10. The method according to claim 1, wherein the indication(s) relating to the beam generator comprise(s) at least one zone on the ground and an indicator that is a function of the value(s) relating to the risk of injury associated with the zone(s) on the ground.

11. The method according to claim 1, wherein the parameters of the light beam comprise several of the following parameters:

a coefficient relating to a duration of emission of the light beam and its pulse frequency; and an attenuation coefficient of the light beam in air.

12. The method according to claim 1, wherein at least one specific zone of the one or more zones on the ground is predefined, and the method comprises issuing an alert message if the value(s) relating to the risk of injury associated with one of the one or more zones on the ground that is distinct from the specific zone(s) is/are greater than a predefined risk threshold.

13. The method according to claim 1, wherein several zones are displayed, the zones being separated by lines with associated values of densities per unit surface area of risk of injury.

14. A system for continuous in-flight management of a beam generator on board an aircraft, the system comprising:

the beam generator emitting a light beam;

sensors;

a calculator; and a display device, wherein the system is configured to implement the method according to claim 1.

15. A method for continuous in-flight management of a beam generator on board an aircraft, the aircraft comprising:

the beam generator emitting a light beam;

sensors;

a calculator;

a display; and a tracker, the method comprising the following steps:

continuously acquiring a value of at least one parameter of the beam generator by at least one of the sensors;

continuously acquiring a value of at least one parameter of the aircraft by at least one of the sensors, the parameter(s) of the aircraft being distinct from the parameter(s) of the beam generator;

continuously estimating at least one piece of information relating to the reliability of the beam generator over a predetermined time period using the calculator, as a function of successive values of the parameter(s) of the beam generator, successive values of the parameter(s) of the aircraft, and data from a stored history of the beam generator; and displaying at least one indication relating to the beam generator on the display, the indication(s) being dependent on the piece of information, wherein the method comprises the following steps:

determining a position of the aircraft, using the tracker;

determining parameters of the light beam, the parameters of the light beam being distinct from the parameter(s) of the aircraft and the parameter(s) of the beam generator;

determining a Nominal Ocular Hazard Distance (NOHD) relative to the light beam as a function of the parameters of the light beam, using the calculator; and determining at least one value relating to the risk of injury likely to be caused by the beam generator in at least one zone on the ground, as a function of the position of the aircraft, the NOHD, the parameters of the light beam and the piece of information relating to the reliability of the beam generator, using the calculator, at the time of the displaying step, the indication(s) relating to the beam generator is/are a function of the value(s) relating to the risk of injury associated with the zone(s) on the ground.

16. The method according to claim 15, comprising acquiring at least one parameter of the environment of the aircraft by at least one of the sensors, the parameter(s) of the environment being chosen from a temperature of the air outside the aircraft, an atmospheric pressure outside the aircraft, a humidity level of the air outside the aircraft, the step of estimating the piece of information relating to the reliability of the beam generator also being made as a function of the parameter(s) of the environment.

17. The method according to claim 15, wherein the parameter(s) of the beam generator is/are selected from temperature, duration of use, vibrations and servo data of the beam generator, and the parameter (s) of the aircraft comprise(s) a vibration or a load factor of the aircraft.

18. The method according to claim 15, wherein the history of the beam generator comprises at least data relating to malfunctions and failures of the beam generator, maintenance operations performed on the beam generator, durations of use of the beam generator and light beam emissions made by the beam generator.

19. The method according to claim 15, wherein at least one specific zone of the one or more zones on the ground is predefined, and the method comprises issuing an alert message if the value(s) relating to the risk of injury associated with one of the one or more zones on the ground that is distinct from the specific zone(s) is/are greater than a predefined risk threshold.

20. A system for continuous in-flight management of a beam generator on board an aircraft, comprising:

the beam generator capable of emitting a light beam;

sensors;

a calculator;

a display; and a tracker;

wherein the system is configured to implement a method comprising the following steps:

continuously acquiring a value of at least one parameter of the beam generator by at least one of the sensors;

continuously acquiring a value of at least one parameter of the aircraft by at least one of the sensors, the parameter(s) of the aircraft being distinct from the parameter(s) of the beam generator;

continuously estimating at least one piece of information relating to the reliability of the beam generator over a predetermined time period using the calculator, as a function of successive values of the parameter(s) of the beam generator, successive values of the parameter(s) of the aircraft, and data from a stored history of the beam generator; and displaying at least one indication relating to the beam generator on the display, the indication(s) being dependent on the piece of information, wherein the method comprises the following steps:

determining a position of the aircraft, using the tracker;

determining parameters of the light beam, the parameters of the light beam being distinct from the parameter(s) of the aircraft and the parameter(s) of the beam generator;

determining a Nominal Ocular Hazard Distance (NOHD) relative to the light beam as a function of the parameters of the light beam, using the calculator; and determining at least one value relating to the risk of injury likely to be caused by the beam generator in at least one zone on the ground, as a function of the position of the aircraft, the NOHD, the parameters of the light beam and the piece of information relating to the reliability of the beam generator, using the calculator, at the time of the displaying step, the indication(s) relating to the beam generator is/are a function of the value(s) relating to the risk of injury associated with the zone(s) on the ground.

* * * * *